United States Patent
Dateki et al.

(10) Patent No.: US 8,340,585 B2
(45) Date of Patent: Dec. 25, 2012

(54) RECEIVING DEVICE AND COMMUNICATION SYSTEM

(75) Inventors: Takashi Dateki, Kawasaki (JP); Tetsuya Yano, Kawasaki (JP); Kazuhisa Obuchi, Kawasaki (JP); Daisuke Ogawa, Kawasaki (JP); Hideto Furukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 982 days.

(21) Appl. No.: 12/216,056

(22) Filed: Jun. 27, 2008

(65) Prior Publication Data

US 2008/0268782 A1 Oct. 30, 2008

Related U.S. Application Data

(63) Continuation of application No. PCT/JP2005/024065, filed on Dec. 28, 2005.

(51) Int. Cl.
*H04B 17/00* (2006.01)
*H04B 1/00* (2006.01)
*H04B 7/00* (2006.01)

(52) U.S. Cl. ............ 455/67.11; 455/67.13; 455/69

(58) Field of Classification Search .......... 455/69, 455/67.11, 67.13, 133, 134, 432.2, 452.2, 455/161.3, 135, 277.2; 375/260, 264, 324, 375/349

See application file for complete search history.

(56) References Cited

U.S. PATENT DOCUMENTS

| | | | |
|---|---|---|---|
| 7,881,389 B2 * | 2/2011 | Cheng et al. | ............. 375/260 |
| 2001/0024427 A1 | 9/2001 | Suzuki | |
| 2006/0089102 A1 | 4/2006 | Nishio et al. | |
| 2006/0209669 A1 * | 9/2006 | Nishio | .................. 370/208 |
| 2007/0195897 A1 | 8/2007 | Cheng et al. | |

FOREIGN PATENT DOCUMENTS

| | | |
|---|---|---|
| EP | 1233639 | 8/2002 |
| EP | 1289181 | 3/2003 |

(Continued)

OTHER PUBLICATIONS

Zhong-Hai Han, et al., "Opportunistic Scheduling with Partial Channel Information in OFDMA/FDD Systems", Vehicular Technology Conference, 2004. VTC2004-Fall. 2004 IEEE 60th, vol. 1, pp. 511-514, Sep. 26-29, 2004.
International Preliminary Report on Patentability and Written Opinion, issued by the International Bureau of WIPO for International Application No. PCT/JP2005/024065, Jul. 10, 2008.
The extended European search report issued for corresponding European Application No. 05822645.7 dated Aug. 3, 2012.

*Primary Examiner* — Eugene Yun
(74) *Attorney, Agent, or Firm* — Myers Wolin, LLC

(57) ABSTRACT

A receiving device and a communication system wherein the frequency usage efficiency is raised to improve the communication throughput. The receiving device comprises a receiving unit that receives multicarrier signals in which a plurality of subcarriers are divided into a plurality of subcarrier blocks (frequency blocks) each including at least one subcarrier and in which signals to be transmitted to receiving devices are allocated on a subcarrier block basis; an estimating unit that estimates, for each of the subcarrier blocks, quality values indicative of the reception statuses of the signals allocated to the plurality of subcarrier blocks; and a notifying unit that notifies a transmitting device of information indicative of a high quality subcarrier block having a high quality value in the quality values, a quality value in the high quality subcarrier block, and an interval of the subcarrier blocks having quality value of which a difference from the quality value in the high-quality subcarrier block falls within a predetermined threshold value.

6 Claims, 12 Drawing Sheets

FOREIGN PATENT DOCUMENTS

| | | |
|---|---|---|
| JP | 2001-238269 | 8/2001 |
| JP | 2004-208234 | 7/2004 |
| WO | 2005/020488 | 3/2005 |
| WO | 2005/089000 | 9/2005 |

* cited by examiner

RECEIVING DEVICE AND COMMUNICATION SYSTEM

CROSS-REFERENCE TO RELATED APPLICATION

This is a continuation of Application PCT/JP2005/024065, filed on Dec. 28, 2005, now pending, the contents of which are herein wholly incorporated by reference.

BACKGROUND OF THE INVENTION

The present invention relates to a receiving device and a communication system for adaptively performing frequency allocation in a multicarrier transmission system.

Over the recent years, an OFDM (Orthogonal Frequency Division Multiplexing) system has been adopted for transmission methods of a variety of communication systems, and has realized high-speed data communications at high frequency efficiency. The OFDM system is a system of dividing transmission data into plural pieces of data, mapping the divided pieces of transmission data to a plurality of orthogonal carrier waves (subcarriers), and transmitting the data in parallel on a frequency-axis.

In the individual receiving devices in the communication system that utilizes this type of multicarrier transmission system, frequency bands affected by frequency selective fading differ due to differences of receiving environments thereof. Such being the case, there is a proposed technique for increasing a cell throughput on the whole of the communication system by such a scheme that a transmission-side device performs scheduling for allocating the individual receiving devices serving as communication partner devices to the frequency bands (subcarriers) that are hard to undergo fading.

The frequency scheduling utilized in the multicarrier transmission system such as OFDM will hereinafter be described with reference to FIGS. 10 and 11. FIG. 10 is a diagram showing an example of frequency selective fading, and FIG. 11 is a diagram showing an example of the frequency scheduling. To be specific, FIG. 10 illustrates how the frequency selective fading is in a time block ranging from a timing 2T to a timing 3T in FIG. 11.

The example illustrated in FIG. 10 shows that the signal received by the receiving device of a user 1 has a highest Signal-to-Noise Ratio (which will hereinafter be abbreviated to SNR) in a subcarrier block (frequency block) f1 ranging from the timing 2T to the timing 3T, while the signal received by the receiving device of a user 2 has the highest SNR in a subcarrier block f4.

In this case, the scheduling is done in the transmitting device so as to allocate, as shown in FIG. 11, the subcarrier block f1 having a highly acceptable SNR at the timings 2T to 3T to transmission data for the user 1 and the subcarrier block f4 to the transmission data for the user 2.

Thus, for performing the proper frequency scheduling in the transmitting device, the transmitting device is required to accurately know a reception environment of the reception SNR etc in each of the receiving devices. A technique that each receiving device feeds the self reception environment back to the transmitting device, is adopted from this necessity.

In the case of the communication system in which the single transmitting device communicates with a plurality of receiving device serving as communication partner devices, an operation that all the receiving devices feed the reception SNRs related to all the subcarrier blocks back to the transmitting device, results in a high increase in quantity of consumption of resources of a feedback link. This causes a problem that the frequency efficiency decreases, and resultantly a data transmission throughput on the feedback link declines.

Proposed for solving this problem is a method of reducing a feedback information quantity in such a way that each receiving device feeds back to the transmitting device only positions of N-pieces of subcarrier blocks in the sequence from the subcarrier block having a highest average SNR down to the lowest in the respective received subcarrier blocks (refer to the following Non-Patent document 1). FIG. 12 is a diagram showing a concept of how feedback information is generated by the conventional art described above.

FIG. 12 shows an example of dividing a communication frequency bandwidth into 18-pieces of subcarrier blocks. The receiving device feeds back five high-order average SNRs (#n1 through #n5 shown in FIG. 12) in the average SNRs of the respective subcarrier blocks related to the frequency selective fading. At this time, the receiving device feeds back, for example, the SNRs (SNR(n1), SNR(n2), SNR(n3), SNR(n4), SNR(n5)) of the respective subcarrier blocks.

[Non-Patent document 1] Zhong-Hai Han Yong-Hwan Lee, [opportunistic scheduling with partial channel information in OFDMA/FDD systems], VTC2004-Fall. 2004 IEEE 60th Volume 1, 26-29 Sep. 2004, P 511-514 Vol. 1

The conventional art described above involves feeding back the N-pieces of SNRs in the sequence from the maximum SNR down to the minimum SNR, however, realization of the precise frequency scheduling entails increasing the SNR count (N) for the feedback to some extent, and there is still a problem that the feedback information quantity can not be reduced sufficiently.

SUMMARY OF THE INVENTION

It is an object of the present invention, which was devised in view of the problems given above, to provide a receiving device and a communication system that improve a communication throughput by raising the frequency efficiency.

The present invention adopts the following configurations in order to solve the problems given above. Namely, the present invention is a receiving device comprising: a receiving unit receiving multicarrier signals in which a plurality of subcarriers are divided into a plurality of subcarrier blocks (frequency blocks) each containing at least one subcarrier, and in which signals to be transmitted to receiving devices are allocated on a subcarrier block basis; an estimating unit estimating, for each of the plurality of subcarrier blocks, quality values indicative of reception states of the signals allocated to the subcarrier blocks; and a notifying unit notifying a transmitting device of information indicative of a high-quality subcarrier block having a high quality value in the quality values, a quality value of the high-quality subcarrier block, and an interval of the subcarrier blocks having the quality values of which a difference from the quality value of the high-quality subcarrier block falls within a predetermined threshold value.

According to the present invention, each of the receiving devices notifies of the information taken into consideration on such an occasion that the transmitting device allocates the transmission signals to be transmitted to the respective receiving devices to the individual subcarrier blocks with respect to the multicarrier signals in which the plurality of subcarrier blocks are divided into the plurality of subcarrier blocks each containing at least one subcarrier.

This notified information is generated based on the quality values representing the reception states of the signals allocated to the respective subcarrier blocks of the received multicarrier signals. Namely, the notified information is generated in a way that contains the information showing the high-quality subcarrier block having the high quality value in the estimated quality values of the subcarrier blocks, the quality value of the high-quality subcarrier block, and the interval of the subcarrier blocks having the quality values of which the difference from the quality difference of the high-quality subcarrier block falls within the predetermined threshold value.

Herein, the information indicative of the subcarrier blocks connotes information on, e.g., positions of the subcarrier blocks and may also be block numbers etc for specifying the subcarrier blocks. Moreover, the quality value represents a value for showing, e.g., a signal-to-noise ratio (SNR).

Thus, according to the present invention, without transmitting the quality values about all the subcarrier blocks, each receiving device is notified of, as the information required at the minimum, the information (containing the quality value) on the high-quality subcarrier block having the high quality value and the subcarrier block interval based on the predetermined threshold value by the standard of the high-quality subcarrier block.

With this scheme, the base station device can estimate, based on such a general nature of the frequency selective fading that the highly acceptable reception environment can be ensured over the broad frequency domain in the vicinity of the subcarrier block having the high reception quality, the reception environment information such as the quality values related to the subcarrier blocks other than the high-quality subcarrier block by the standard of the information on the high-quality subcarrier block.

Hence, according to the present invention, the amount of information of which the receiving device notifies the transmitting device can be restrained, and the accurate reception environment information of each receiving device can be provided to the transmitting device. By extension, in the case of considering the communication system built up by the receiving devices and the transmitting device, it is feasible to increase the frequency efficiency and to improve the communication throughput as a whole of the system.

Moreover, the notifying unit may notify of, as the interval of the subcarrier blocks having the quality values of which the difference from the quality difference of the high-quality subcarrier block falls within the predetermined threshold value, information indicative of the subcarrier block having a minimum frequency band and information indicative of the subcarrier block having a maximum frequency band in the subcarrier blocks falling within the interval.

With this scheme, the transmitting device, if only knowing the information on the predetermined threshold value in the receiving device, can estimate the quality values of the subcarrier blocks having the quality values of which the difference from the quality difference of the high-quality subcarrier block falls within the predetermined threshold value.

Therefore, according to the present invention, it may be sufficient to notify of the information indicative of the target subcarrier block, and hence the information of which the receiving device notifies the transmitting device can be restrained to a greater degree.

Further, the notifying unit may also notify of, together with the information indicative of the subcarrier block having the minimum frequency band and the information indicative of the subcarrier block having the maximum frequency band, a quality value of the subcarrier block having the minimum frequency band and a quality value of the subcarrier block having the maximum frequency band.

With this scheme, the transmitting device receiving the notification can precisely estimate the reception state of the receiving device.

Moreover, in addition to the configuration described above, the receiving device according to the present invention may further comprise a dispersion estimating unit estimating a delay dispersion of the received multicarrier signals. In this case, the notifying unit may notify the transmitting device of the delay dispersion estimated by the dispersion estimating unit in place of the interval of the subcarrier blocks.

According to the present invention, in addition to the quality value of the high-quality subcarrier block and the information indicative of the high-quality subcarrier block, the transmitting device is notified of the delay dispersion.

With this scheme, the transmitting device can detect a spread of the quality values of the subcarrier blocks in the periphery of the frequency band having the high-quality subcarrier block through the delay dispersion, and can therefore estimate the individual quality values of the subcarrier blocks in the periphery of the frequency band having the high-quality subcarrier block from the quality value of the high-quality subcarrier block without being notified of these individual quality values.

Owing to this scheme, according to the present invention, the transmitting device can estimate the accurate reception information from the notification of a small amount of information on the reception information in the receiving devices.

Further, according to the present invention, the notifying unit may further include a generating unit generating difference information in which a difference between the quality value of the high-quality subcarrier block and the quality value of each of the subcarrier blocks is expressed by the amount of information that becomes smaller with respect to the subcarrier block having the frequency band existing farther from the frequency band of the high-quality subcarrier block. In this case, the notifying unit may notify the transmitting device of the difference information in place of the interval of the subcarrier blocks.

According to the present invention, the transmitting device is notified of the difference information in which the difference of each of the quality values of the subcarrier blocks in the periphery of the frequency band of the high-quality subcarrier block from the quality value of the high-quality subcarrier block is expressed by the predetermined amount of information, together with the information indicative of the high-quality subcarrier block and the quality value of the high-quality subcarrier block.

Moreover, the difference information is generated so as to have the information quantity becoming smaller with respect to the subcarrier blocks having the frequency bands that are farther from the frequency band of the high-quality subcarrier block.

This scheme enables the transmitting device receiving the information to estimate the quality information of the subcarrier blocks in the periphery of the frequency band of the high-quality subcarrier block by knowing the information on the amount of information by which the difference information is expressed.

Thus, according to the present invention, the transmitting device can be notified of the quality values in the periphery of the frequency band of the high-quality subcarrier block having the high quality value with the small information quantity, and hence the transmitting device can be accurately notified of the reception state of the receiving device while restraining the information quantity of the information of which the receiving device notifies the transmitting device.

Moreover, the present invention relates to a transmitting device that estimates each of the quality values of the subcarrier blocks in each of the receiving devices on the basis of the information of which each receiving device notifies, and preferentially allocates, based on the estimated quality values, signals to be transmitted to the receiving device having the high quality value related to the target subcarrier block when allocating the signals to be transmitted to each receiving device on a subcarrier block basis.

Namely, the scheme is that the transmitting device can precisely grasp the reception state of each receiving device even from the feedback information with the information quantity restrained by the receiving device according to the present invention.

Accordingly, the present invention can be applied to a communication system built up by the receiving devices described above and the transmitting device described above.

Further, the present invention can be realized as a communication method, and a program making an information processing device (computer) function as the receiving device and the transmitting device according to the present invention, or a recoding medium recorded with the program, which have the same features as those of the receiving device and the transmitting device according to the present invention.

Still further, the receiving device and the transmitting device according to the present invention may be communication devices performing wireless or wired communications with each other, and may also be devices, elements, etc that perform the interface-signal-based communications within the computer.

It should be noted that the present invention focuses on the signal allocation to the subcarrier blocks, i.e., the frequency scheduling but limits nothing about time scheduling on a time-axis.

According to the present invention, it is possible to provide the receiving device, the communication system and the communication method that are capable of increasing the frequency efficiency and improving the communication throughput.

DESCRIPTION OF THE PREFERRED EMBODIMENTS

A communication device including a receiving device and a transmitting device in an embodiment of the present invention, will hereinafter be described with reference to the drawings.

In the following discussion, a receiving device and a transmitting device in the embodiment will be described by way of separate communication devices for explanatory convenience's sake, however, the present invention is not limited to this configuration but may embrace a communication device including both of a receiving function and a transmitting function, which will hereinafter be described below.

Further, the present embodiment exemplifies a mobile terminal as the receiving device and a base station device as the transmitting device performing wireless communications with a plurality of mobile terminals. Note that those communication devices each shall have a function enabling an OFDM system as a multicarrier system. Moreover, the communication devices according to the embodiment may, as other types of devices, also be power-line communication devices etc performing the communications via cables and devices, elements, etc that conduct interface-signal-based communications within a computer. The configuration in the following embodiment is no more than an exemplification, and the present invention is not limited to the configuration in the embodiment.

[Transmitting Device]

Figure 1:
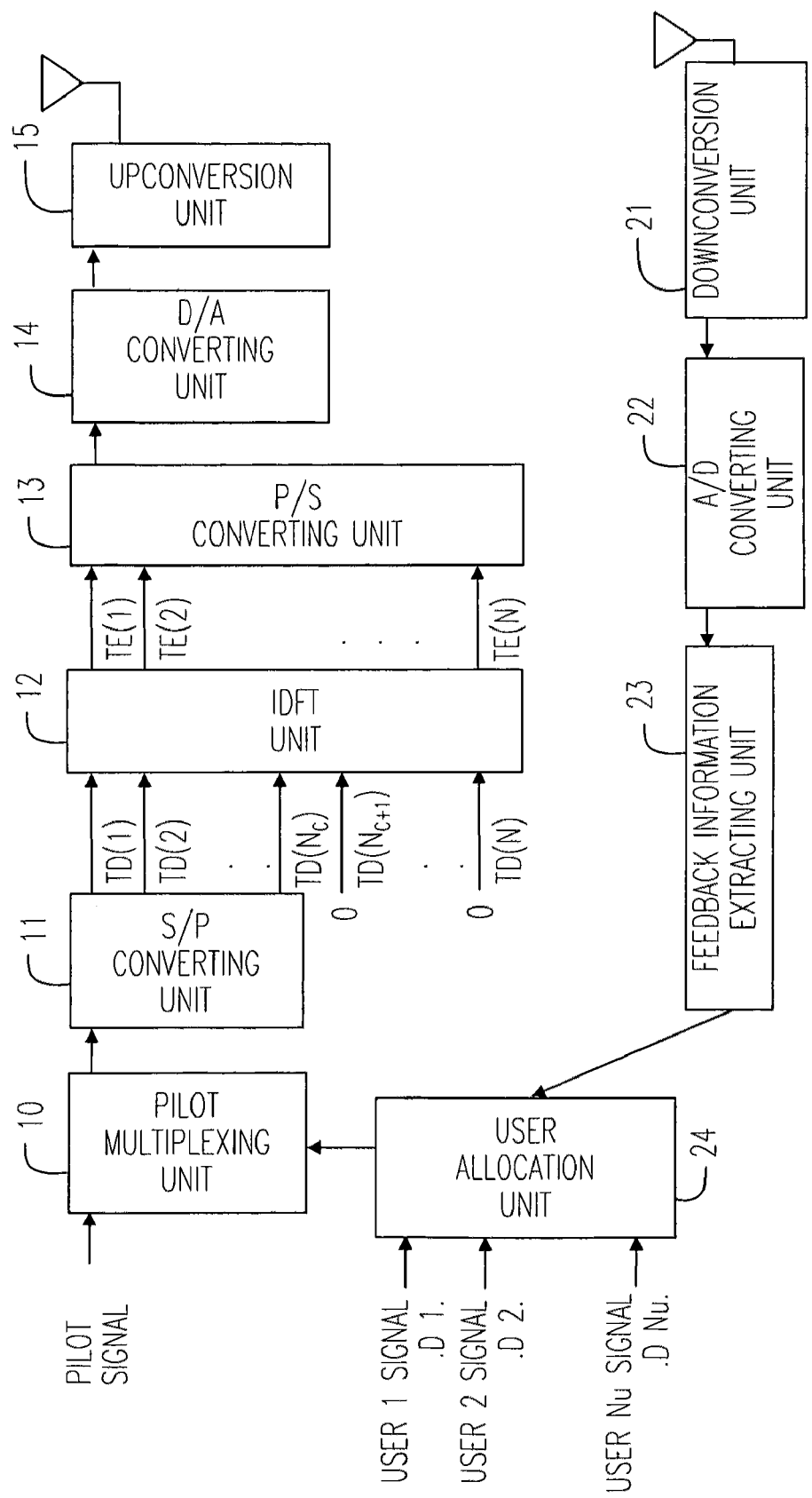
FIG. 1 is a diagram showing a functional configuration of a base station device (transmitting device) in an embodiment.

To begin with, the base station device serving as the transmitting device according to the embodiment will hereinafter be described. A functional configuration of the base station device in the embodiment will hereinafter be explained with reference to FIG. 1. FIG. 1 is a diagram showing the functional configuration of the base station device.

The base station device includes a pilot multiplexing unit 10, a serial/parallel (which will hereinafter be abbreviated to S/P) converting unit 11, an IDFT unit 12, a parallel/serial (which will hereinafter be abbreviated to P/S) converting unit 13, a digital/analog (which will hereinafter be abbreviated to D/A) converting unit 14, an upconversion unit 15, a downconversion unit 21, an analog/digital (which will hereinafter be abbreviated to A/D) converting unit 22, a feedback information extracting unit 23, a user allocation unit 24, etc.

Figure 2:
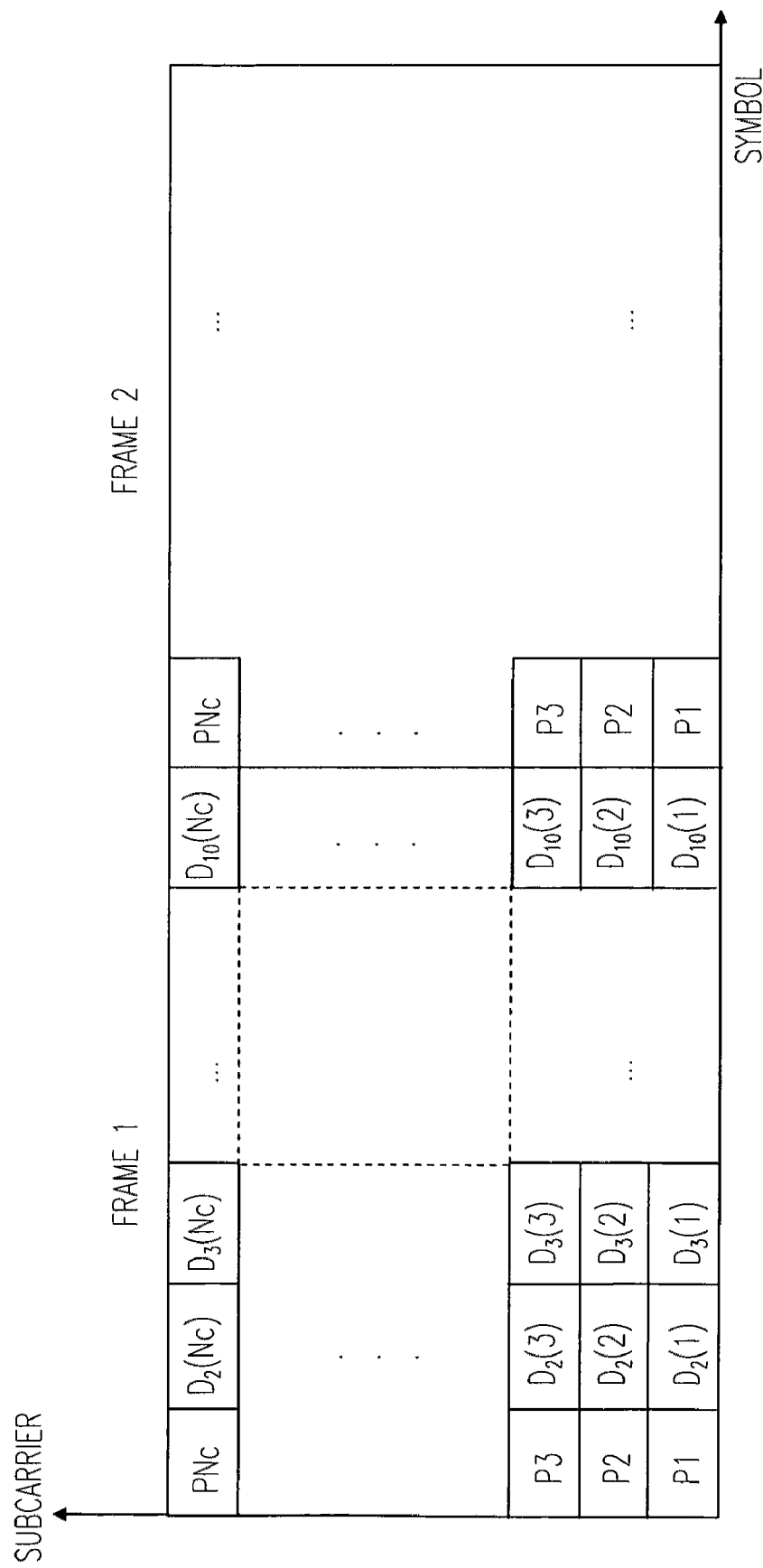
FIG. 2 is a diagram showing an example of a structure of an OFDM frame.

The pilot multiplexing unit 10, when receiving data signals (containing a control signal etc) that should be transmitted from the user allocation unit 24 and then receiving pilot signals together with the data signals, generates a serial signal stream in which the data signals and the pilot signals are disposed in predetermined positions based on an OFDM frame. Herein, a structure of the OFDM frame will be briefly explained with reference to FIG. 2. FIG. 2 is a diagram illustrating the structure of the OFDM frame in the embodiment.

In the OFDM frame in the embodiment, each frame is assembled by $N_C$-pieces of subcarriers, and the pilot signals and the data signals are disposed in predetermined positions. In FIG. 2, P1 through $PN_C$ designate the pilot signals, and Da(b) (where a represents numerals 2 to 10, and b represents 1 through $N_C$) denotes the data signal allocated to a b-subcarrier of an a-th symbol in each frame. It should be noted that the present invention does not limit the OFDM frame to the structure illustrated in FIG. 2.

The S/P converting unit 11 converts the serial signal streams generated by the pilot multiplexing unit 10 into parallel signals arranged in parallel corresponding to the number of the subcarrier count ($N_C$).

The IDFT unit 12 executes an IDFT process on an OFDM symbol basis with respect to the parallel signals output from the S/P converting unit 11. Normally, an IDFT size N utilized for this IDFT process is larger than the effective subcarrier count ($N_C$), and hence the IDFT unit 12 sets zero (0) signals in an interval between an ($N_C$+1)th signal and an N-th signal that are subsequent to $N_C$-pieces of inputted parallel signals, and executes the IDFT process about totally N-pieces of parallel signals.

The signals TE(f), on the time-base, of the subcarriers output from the IDFT unit 12 are synthetically multiplexed by the P/S converting unit 13, then attached with a guard interval by a guard interval attaching unit (unillustrated) etc and converted into analog signals by the D/A converting unit 14. A central frequency of the thus-converted analog signals is converted into a radio transmission frequency by the upconversion unit 15, and the signals are transmitted from an antenna element.

On the other hand, the base station device receives reception environment information of the individual mobile terminals from the plurality of mobile terminals serving as communication-partner devices. The reception environment information received is processed by the following function units. An in-depth description of contents of the reception environment information will be made later on. Further, in the embodiment, the reception environment information is simply transmitted through wireless communications, however, the present invention does not restrict a method of transmitting the reception environment information to the base station device from each mobile terminal.

The radio frequency signals containing the reception environment information are received by the antenna element and then converted into baseband signals by the downconversion unit 21. The baseband signals are, after being converted into digital signals by the A/D converting unit 22, inputted to the feedback information extracting unit 23.

The feedback information extracting unit 23 acquires the reception environment information of each of the mobile terminals from the inputted signals. The feedback information extracting unit 23 acquires the reception environment information on each of the plurality of mobile terminals serving as the communication partner devices.

The user allocation unit 24 performs scheduling (which will hereinafter be also termed a user allocation process), based on the reception environment information on the respective mobile terminals, which is transferred from the feedback information extracting unit 23, as to which user's data signals in the data signals for the respective mobile terminals (users) each receiving a transmission request are transmitted and as to which subcarrier block (which may also be a frequency block) the data signals are transmitted via. The user allocation unit 24 divides the $N_C$-pieces of subcarriers into a plurality of subcarrier blocks, and executes the user allocation process on the subcarrier-block basis.

A count setting method of setting a subcarrier block count $N_{fblk}$ for the subcarrier count $N_C$ is not particularly limited but should be optimized corresponding to an installation environment etc of the communication device. Further, if $N_C$>$N_{fblk}$, $N_C$ needs not to be an integral multiple of $N_{fblk}$. Each block may also be organized by a subcarrier count each being different. Moreover, a structure of the subcarrier block may be held beforehand as a fixed value between the transmitting device and the receiving device and may also be made variable, and the transmitting device may notify the receiving device of this variable structure.

Figure 3:
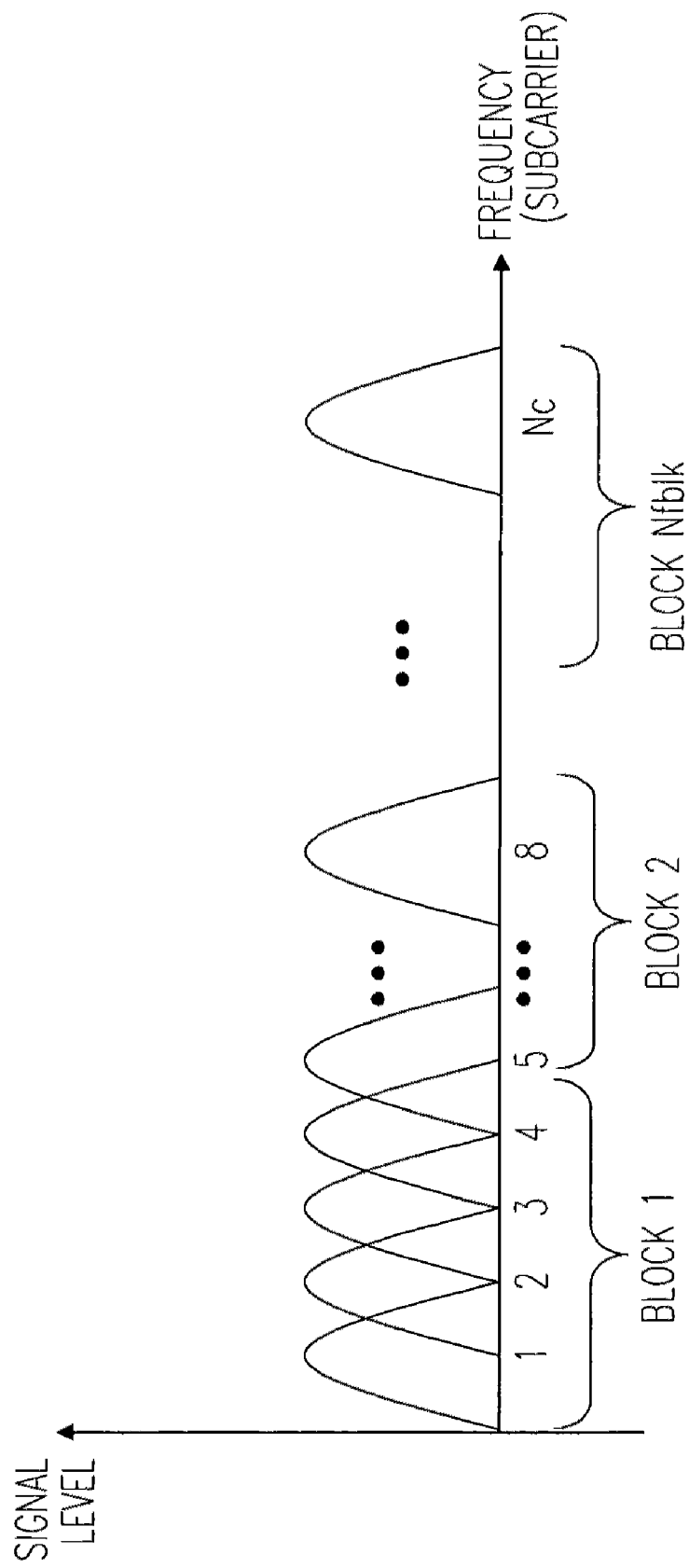
FIG. 3 is a diagram showing an example of a structure of subcarrier (frequency) blocks.

A scheme in the embodiment is that $N_C$ is the integral multiple of $N_{fblk}$, and each subcarrier block contains $N_C/N_{fblk}$-pieces of subcarriers. FIG. 3 is a diagram showing an example of the structure of the subcarrier block in the embodiment. As illustrated in FIG. 3, the embodiment takes such a contrivance that the subcarriers $N_C$ are divided by the subcarrier block count $N_{fblk}$, and the single subcarrier block consists of four pieces of subcarriers.

Note that the user allocation process by the user allocation unit 24 will be explained in detail in the paragraph <User Allocation Process>. The user allocation unit 24 generates the data signals in which the transmission signals to the user are adaptively allocated to predetermined positions in the transmission frame. The user allocation unit 24 transfers the generated data signals to the pilot multiplexing unit 10.

[Receiving Device]

Figure 4:
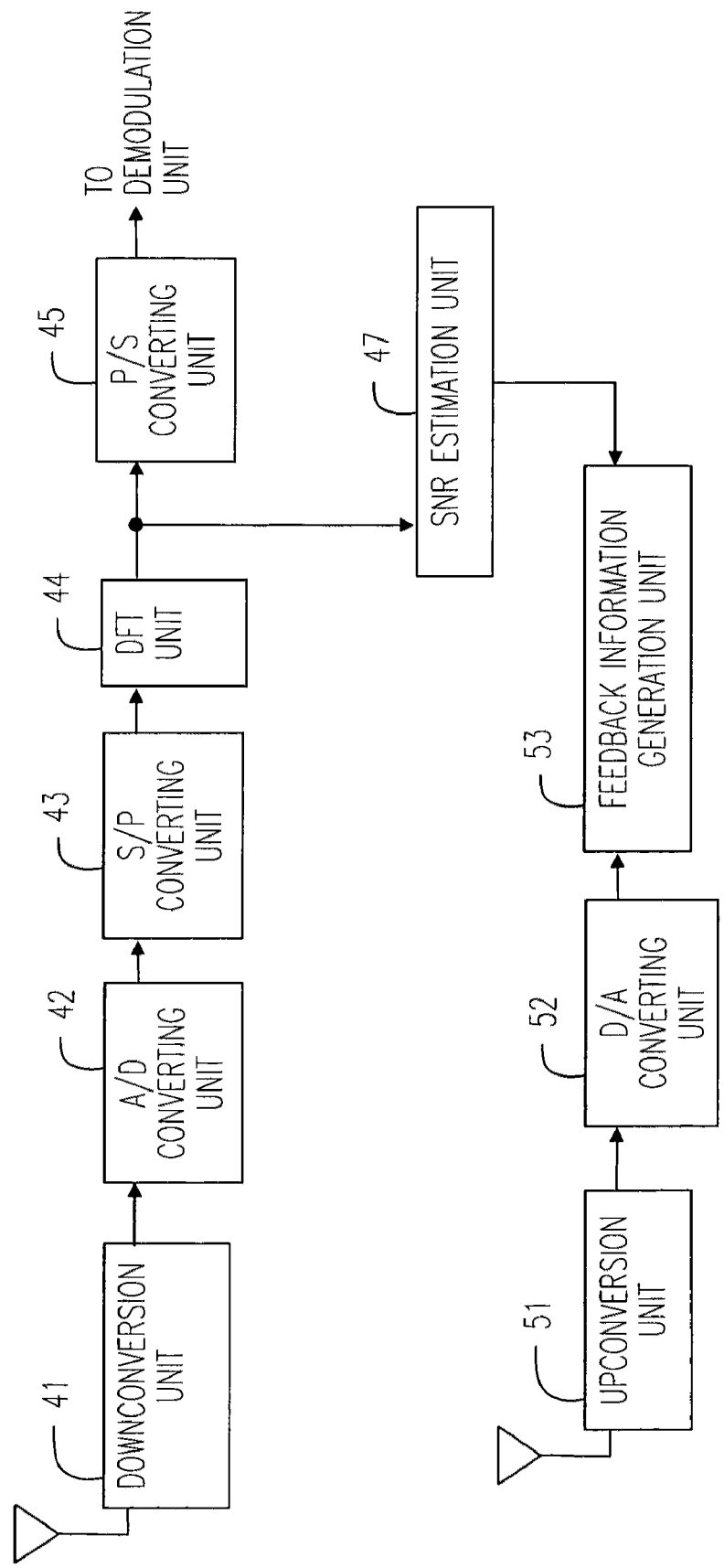
FIG. 4 is a diagram showing a functional configuration of a mobile terminal (receiving device) in the embodiment.

The mobile terminal serving as the receiving device in the embodiment of the present invention will hereinafter be described with reference to FIG. 4. FIG. 4 is a diagram showing a functional configuration of the mobile terminal in the embodiment.

The mobile terminal in the embodiment includes a downconversion unit 41, an A/D converting unit 42, an S/P converting unit 43, a DFT unit 44, a P/S converting unit 45, a Signal-to-Noise Ratio (which will hereinafter be abbreviated to SNR) estimation unit 47, an upconversion unit 51, a D/A converting unit 52, a feedback information generation unit 53, etc.

The downconversion unit 41 converts, when receiving the OFDM-frame-structured radio transmission frequency signals from the antenna element, the radio transmission frequency signals into baseband signals. The baseband signals are, after being converted into digital signals by the A/D converting unit 42, converted by the S/P converting unit 43 into parallel signals of N-samples having the same size as the IDFT size in the base station device. Note that the guard intervals (GIs) are removed from the parallel signals at this time.

The DFT unit 44 executes a DFT process with respect to the inputted parallel signals, and outputs N-pieces of signals corresponding to the subcarrier components. A DFT size utilized for the DFT process is the same as the IDFT size utilized in the transmitting device. At this time, the ($N_C$+1)th signal through the N-th signal among the N-pieces of output signals are the zero signals set by the base station device. These output parallel signals are rearranged in serial signal streams by the P/S converting unit 45 and then transferred to other function units (e.g., a demodulation unit). The output parallel signals are transferred also to the SNR estimation unit 47.

The SNR estimation unit 47 estimates an average SNR of each subcarrier block on the basis of the signal stream corresponding to the individual subcarriers transferred from the DFT unit 44. For example, the average SNR may also be acquired in a way that obtains the SNR of the subcarriers constituting the target subcarrier block and averages these SNRs. Information on the number of the subcarriers constituting each subcarrier block may be stored in a memory etc within the mobile terminal, and the base station device may also previously notify of this information. The estimated average SNR is transferred to the feedback information generation unit 53.

The feedback information generation unit 53 generates the reception environment information for the feedback to the base station device on the basis of the average SNR of the transferred subcarrier block. Note that a process of generating the reception environment information will be described in the paragraph <Reception Environment Information Generating Process>.

The thus-generated reception environment information is converted into the analog signals by the D/A converting unit 52. A central frequency of the thus-converted analog signals is converted into a radio transmission frequency by the upconversion unit 51, and the signals are transmitted from an antenna element.

It is to be noted that the embodiment applies the IDFT to the frequency-time conversion process and the DFT to the time-frequency conversion process, however, the present invention is not limited to these processes, and IFFT may be applied to the frequency-time conversion process, while FFT may be applied to the time-frequency conversion process. Moreover, any type of techniques may be available for the method of transmitting the reception environment information to the base station device from the mobile terminal.

<Reception Environment Information Generating Process>

Figure 5:
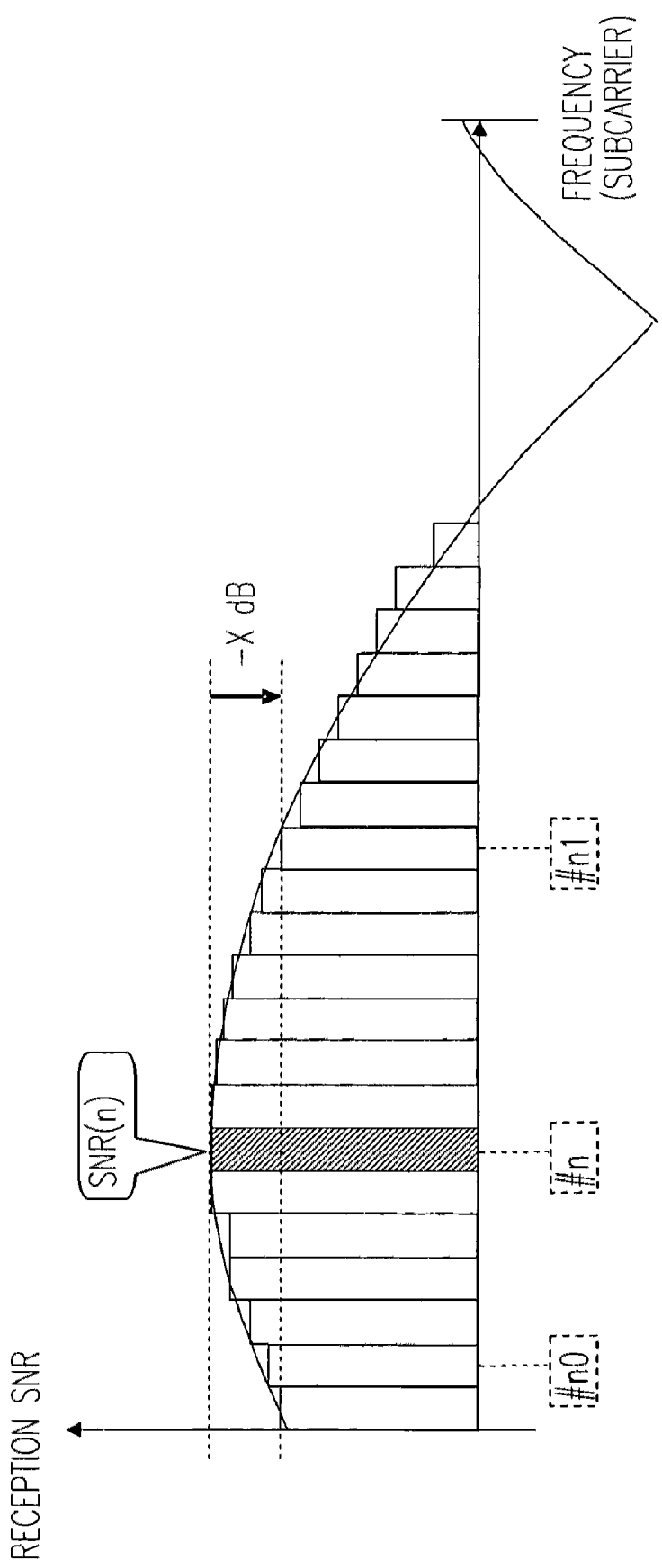
FIG. 5 is a diagram showing a concept of frequency selective fading and a concept of how reception environment information is generated in the embodiment.

The reception environment information generating process in the mobile terminal will hereinafter be described with reference to FIG. 5. FIG. 5 is a diagram showing a concept of frequency selective fading and a concept of how the reception environment information is generated.

The mobile terminal receives the signals affected by the frequency selective fading as illustrated in FIG. 5. The SNR estimation unit 47 of the mobile terminal, upon receiving the signal stream corresponding to the subcarriers with respect to the signals affected by the frequency selective fading, estimates the average SNR (which will hereinafter be simply referred to as the SNR) of the subcarrier block. In FIG. 5, each squared bar line (quadrangle) represents the subcarrier block.

The feedback information generation unit 53 generates, based on the SNR related to the subcarrier block, the reception environment information in the following manner. To start with, the feedback information generation unit 53 detects a subcarrier block number (subcarrier block #n in FIG. 5) having the maximum SNR from within the SNRs related to the individual subcarrier blocks.

Next, the feedback information generation unit 53 detects the subcarrier block number of the subcarrier block having the SNR that is equal to or less than a predetermined threshold value (−X decibel (dB)) from the maximum value of the SNR. The feedback information generation unit 53 respectively detects respectively a subcarrier block number of the subcarrier block having a minimum band and a subcarrier block number of the subcarrier block having a maximum band in these detected subcarrier blocks (subcarrier blocks #n0 and #n1 in FIG. 5). The predetermined threshold value (X dB) may be previously stored as a fixed value common to the system throughout in the memory etc within the mobile terminal, and the base station device may notify of this threshold value as control information.

The feedback information generation unit 53 generates the reception environment information containing the maximum value (SNR(n)) of SNR, the subcarrier block number (n) thereof, the subcarrier block number (n0) of the detected minimum frequency, and the subcarrier block number (n0) of the maximum frequency. It is to be noted that the reception environment information is generated based on the subcarrier block having the maximum SNR in the embodiment, however, without being limited to the maximum SNR, a subcarrier block having the SNR approximate to the maximum SNR may also be used as the basis.

<User Allocation Process>

In the base station device, when receiving the signals containing the reception environment information (n, SNR(n), n0, n1), the feedback information extracting unit 23 extracts and transfers the reception environment information to the user allocation unit 24.

The user allocation unit 24, when receiving the reception environment information (n, SNR(n), n0, n1) about the respective mobile terminals, estimates the SNRs related to the respective subcarrier blocks existing in an interval of n0 to n1 with respect to the mobile terminals on the basis of the reception environment information.

The estimation of the SNRs related to the respective subcarrier blocks involves estimating the SNRs in the subcarrier blocks n0 and n1 by use of the predetermined threshold value X such as SNR(n0)=SNR(n)−X, SNR(n1)=SNR(n)−X, and estimating the SNRs related to other subcarrier blocks as in the following formula (1).

[Mathematical Expression 1]

$$SNR(k) = \frac{\{(n-k) \times SNR(n0) + (k-n0) \times SNR(n)\}}{n - n0 + 1} \quad \text{(Formula 1)}$$
$$(n0 < k < n)$$
$$SNR(k) = \frac{\{(k-n) \times SNR(n1) + (n1-k) \times SNR(n)\}}{n1 - n + 1}$$
$$(n < k < n1)$$

Then, the user allocation unit 24 retains the thus-estimated information, and executes the user allocation process about each mobile terminal. A generally-known technique for this user allocation process is exemplified by a MAX-CI and a Proportional Fair, etc., and the present invention may employ any one of these algorithms or other algorithms. For example, in the user allocation process based on the MAX-CI, the user showing the highest SNR in the SNRs related to the subcarrier blocks that are fed back through the reception environment information, is allocated to that subcarrier block. With respect to the subcarrier blocks having no existence of the SNRs based on the reception environment information, the user exhibiting the highest average SNR in the average SNRs of the individual users, is allocated.

Figure 6:
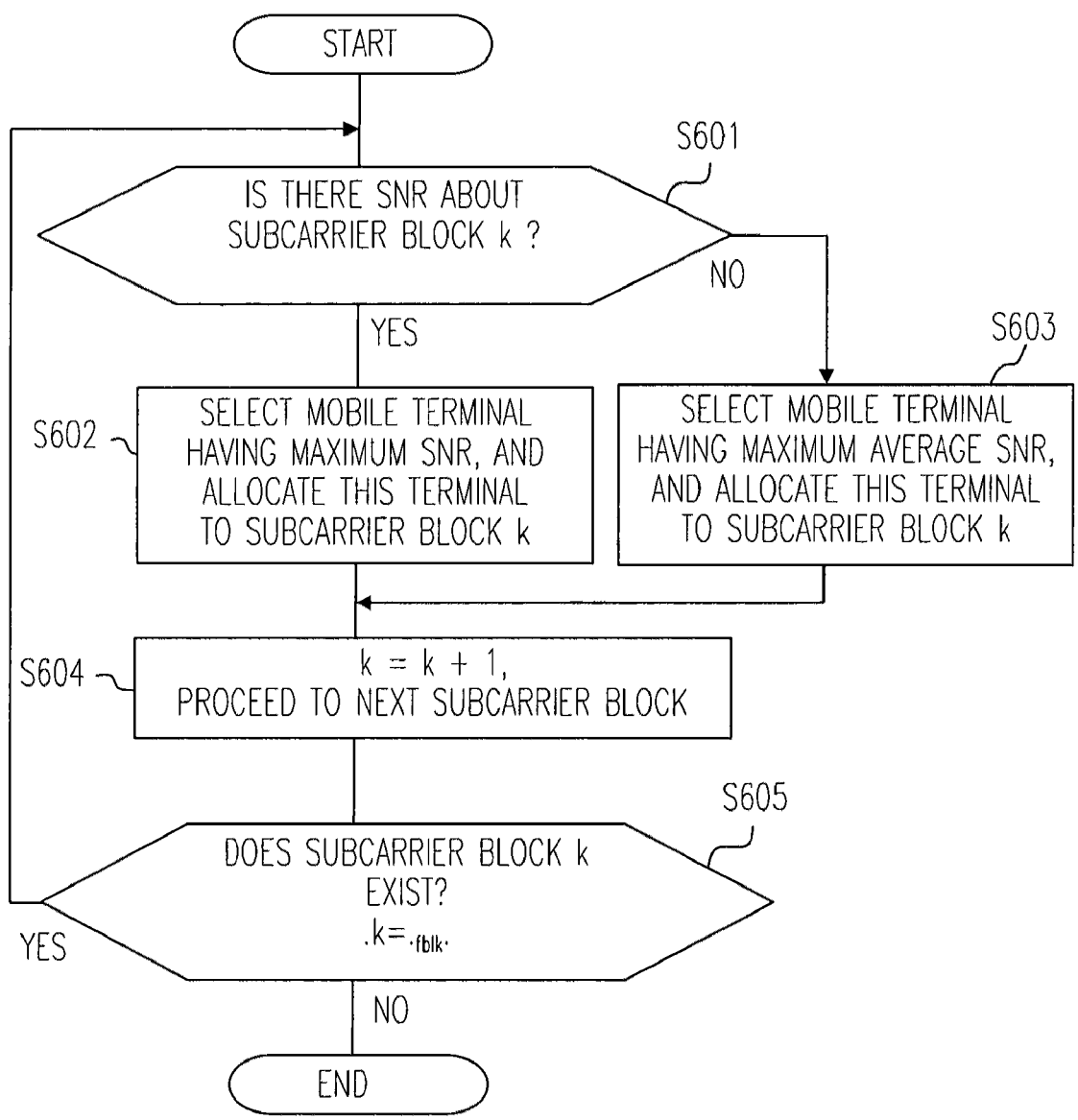
FIG. 6 is a diagram showing a processing flow related to user allocation.

FIG. 6 shows a processing flow of the user allocation process based on the MAX-CI. In the processing flow shown in FIG. 6, to begin with, it is checked whether or not there exists the SNR estimated based on the reception environment information about each subcarrier block (S601). When determining that there exists the SNR related to any one of the mobile terminals about the target subcarrier block (S601; YES), the mobile terminal having the maximum SNR in those SNRs is selected, and the selected mobile terminal is allocated to the target subcarrier block (S602).

While on the other hand, when determining that there does not exist the SNR related to the target subcarrier block (S601; NO), the average SNR becoming the average value of SNRs about the respective mobile terminals is obtained, and the mobile terminal showing the maximum average SNR is allocated to the target subcarrier block (S603).

Upon completion of the user allocation about the target subcarrier block, the next block is set as the target subcarrier block (S604), and the processes described above are executed for all the subcarrier blocks (S605).

Operation/Effect in Embodiment

Transmitted and received between the base station device (the transmitting device) and the mobile terminal (the receiving device) in the embodiment are the signals in which the multicarrier signals composed of the $N_C$-pieces of subcarriers that are divided into the $N_{fblk}$-pieces of subcarrier blocks (frequency blocks) each consisting of the four subcarriers, and the data signals to each mobile terminal are disposed on the subcarrier block basis.

In each mobile terminal, when receiving the multicarrier signals affected by the frequency selective fading, the SNR estimation unit 47 estimates the SNR related to each subcarrier block of the received signals.

Subsequently, the feedback information generation unit 53 generates the reception environment information based on the SNR related to each subcarrier block. The reception environment information contains the subcarrier block number (n) of the subcarrier block having the maximum SNR in the SNRs related to the respective subcarrier blocks, the maximum SNR thereof, the subcarrier block number of the subcarrier block having the minimum frequency band in the subcarrier blocks having the SNRs of which a difference from the maximum SNR is equal to or smaller than the predetermined threshold value (−XdB), and the subcarrier block number of the subcarrier block having the maximum frequency band. The thus-generated reception environment information is transmitted to the base station device.

The base station device receives the reception environment information respectively from the plurality of mobile terminals serving as the communication partner devices. In the base station device receiving the reception environment information, the SNR of each subcarrier block in each of the mobile terminals is estimated based on the reception environment information. The estimation of the SNR involves utilizing the predetermined threshold value (XdB) held by the base station device in common with the plurality of mobile terminals.

Then, when the SNRs of the respective subcarrier blocks with respect to the individual mobile terminals are estimated, the should-be-transmitted signals are allocated based on these estimated SNRs preferentially to the mobile terminals having the higher SNRs about the subcarrier blocks in the transmission signals. The multicarrier signals, in which the data signals are thus allocated, are transmitted to the plurality of mobile terminals.

Thus, according to the embodiment, each mobile terminal is notified of the information (containing the SNR value) related to the subcarrier block having the maximum SNR and the subcarrier block interval based on this subcarrier block as the information required at the minimum without sending the SNRs about all the subcarrier blocks. In the base station device, based on the information concerning the subcarrier block having the maximum SNR, the SNRs about the subcarrier blocks other than the subcarrier block are estimated.

This is based on such an idea that the width of one subcarrier block becomes relatively smaller than what is affected by the frequency selective fading with the result that a change in the SNR of each subcarrier block gets gentle, and a highly acceptable reception environment is ensured over the broad frequency domain in the vicinity of the subcarrier block having the highest quality of reception by utilizing the tendency described above.

With this scheme, according to the embodiment, the adaptive frequency allocation based on the accurate reception environment information can be realized while restraining an information quantity (data size) on the feedback link, and, by extension, a communication throughput can be improved by increasing the frequency efficiency on the whole of the communication system built up by the base station device and the plurality of mobile terminals.

First Modified Example

Figure 7:
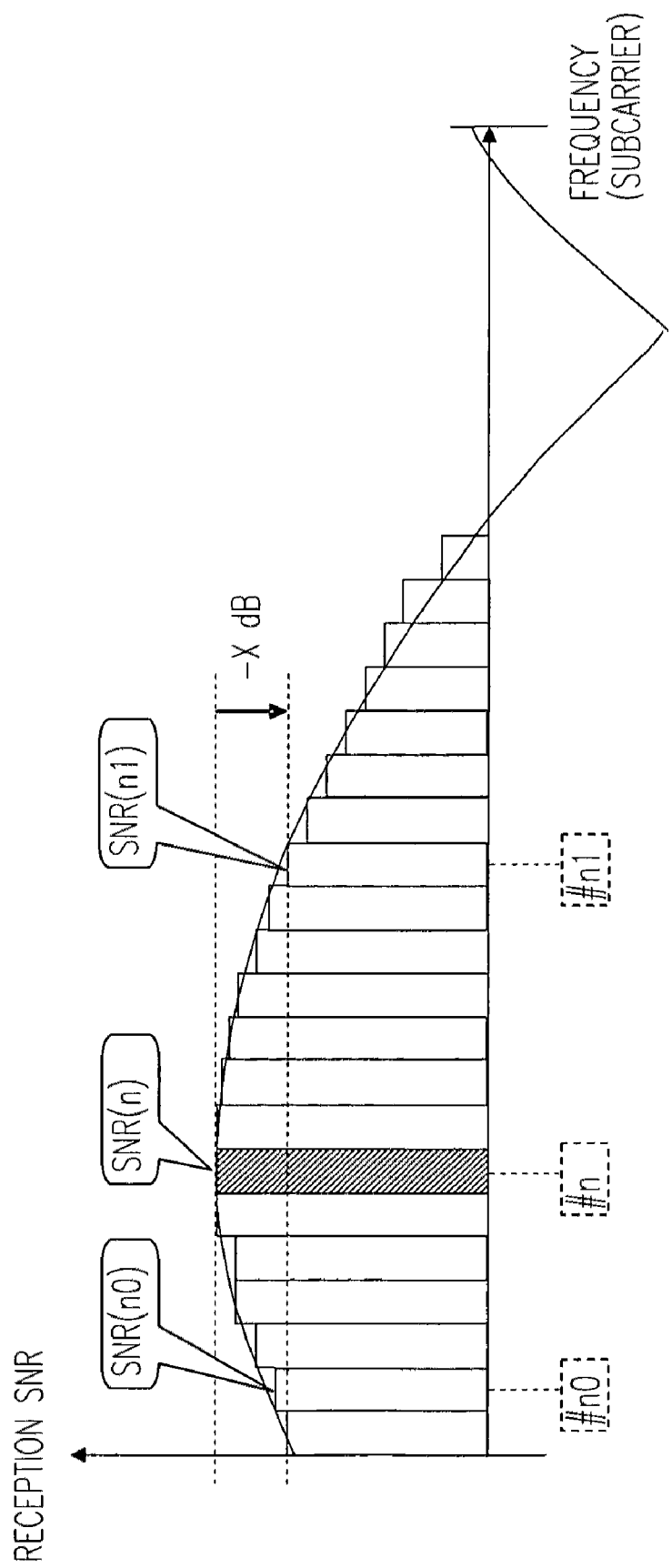
FIG. 7 is a diagram showing the concept of frequency selective fading and the concept of how reception environment information is generated in a first modified example.

In the reception environment information generation method and the user allocation process in the embodiment discussed above, the mobile terminals and the base station device share the predetermined threshold value (X dB) with each other, and the mobile terminal notifies respectively of the subcarrier block (n0) having the minimum frequency band and the subcarrier block (n1) having the maximum frequency band in the subcarrier blocks having the SNRs falling within the threshold value from the maximum SNR, however, another available scheme is that the base station device retains none of the information on this threshold value, and the mobile terminal notifies the base station device of the SNR of the subcarrier block n0 and the SNR of the subcarrier block n1 respectively as substitutes for the subcarrier block numbers n0 and n1 (see FIG. 7).

In this case, though the data size of the reception environment information rises higher than in the embodiment, more accurate values of SNR(n0), SNR(n1) than what is estimated from SNR(n) and the threshold value X can be used, and hence the SNR of the interval between n0 to n1 can be more precisely estimated.

Second Modified Example

In the reception environment information generation method and the user allocation process according to the embodiment discussed above, the mobile terminal notifies of the information on the subcarrier blocks having the SNRs of which the difference from the maximum SNR is equal to or smaller than the threshold value, however, another available scheme is that the mobile terminal notifies the base station device of information on delay dispersion in addition to the maximum SNR and the subcarrier block number (n) thereof. The reception environment information generation process of the mobile terminal and the user allocation process of the base station device in a second modified example will hereinafter be described. For others, the mobile terminal and the base station device shall have the same functional configurations as those in the embodiment discussed above.

<Reception Environment Information Generation Process>

Figure 8:
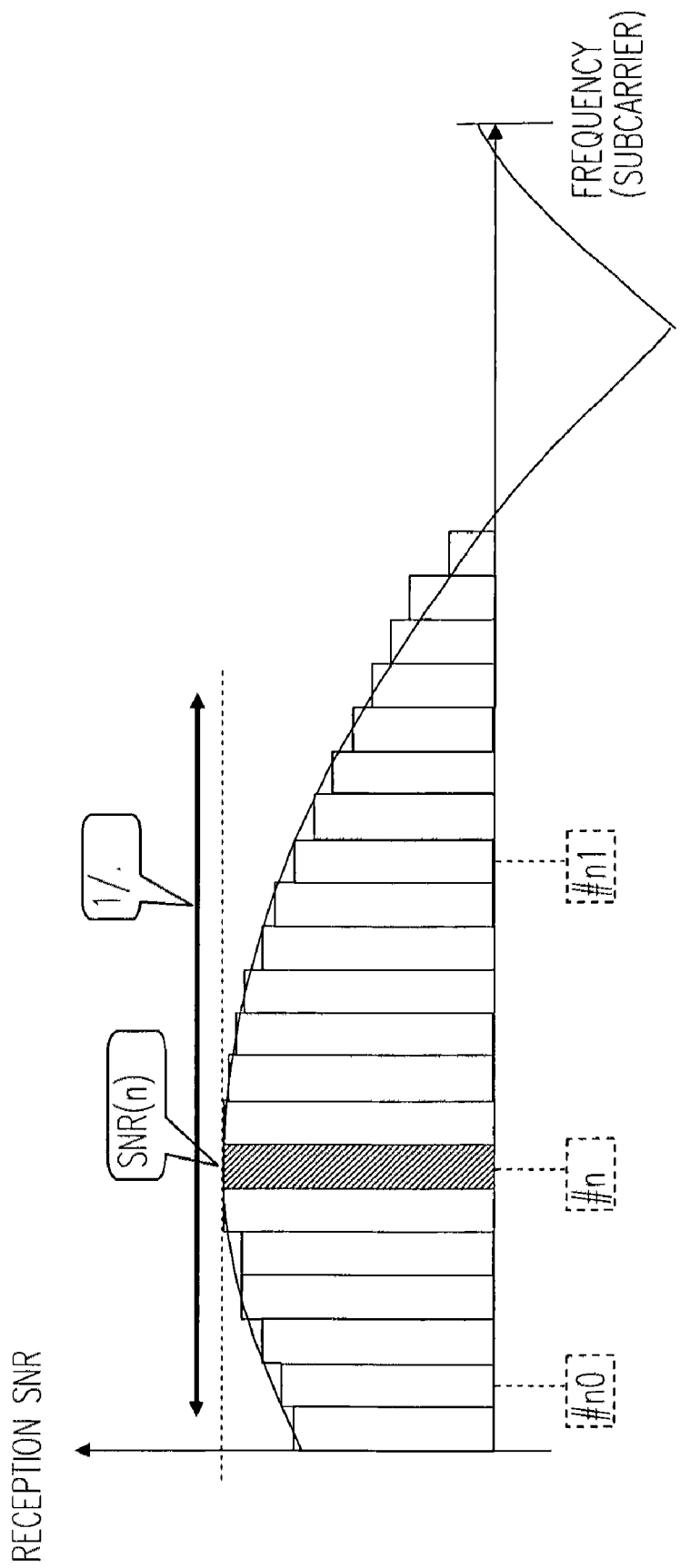
FIG. 8 is a diagram showing the concept of frequency selective fading and the concept of how reception environment information is generated in a second modified example.

The reception environment information generation process in the mobile terminal will hereinafter be described with reference to FIG. 8. FIG. 8 is a diagram showing a concept of the frequency selective fading and a concept of how the reception environment information is generated in the second modified example.

The mobile terminal receives the multicarrier signals affected by the frequency selective fading as illustrated in FIG. 8. The SNR estimation unit 47 of the mobile terminal, when receiving the signal stream corresponding to the respective subcarriers with respect to the signals affected by the frequency selective fading, estimates the average SNR (which will hereinafter be simply referred to as the SNR) of the subcarrier block. In FIG. 8, each squared bar line (quadrangle) represents the subcarrier block.

To start with, the feedback information generation unit 53 detects a subcarrier block number (subcarrier block #n in FIG. 8) having the maximum SNR from within the SNRs related to the individual subcarrier blocks.

Next, the feedback information generation unit 53 obtains a delay dispersion of the received signals. The delay dispersion is obtained by acquiring a delay profile with respect to the received signals as shown in FIG. 8, i.e., by acquiring waveform information in a time-axis domain (time-reception power axis). The feedback information generation unit 53 obtains the delay dispersion on the basis of the thus-acquired delay profile. A delay dispersion σ is acquired in. e.g., the following (formula 2), where P(t) denotes the delay profile. A reciprocal of the delay dispersion information represents the SNR's dispersion (spread) of the reception signals.

[Mathematical Expression 2]

$$\sigma^2 = \frac{\int t^2 P(t)dt - \left(\int tP(t)dt\right)^2}{\left(\int P(t)dt\right)^2}$$ (Formula 2)

The feedback information generation unit 53 generates the reception environment information containing the maximum value (SNR(n)) of the SNR, the subcarrier block number (n) thereof and the delay dispersion information.

<User Allocation Process>

In the base station device, when receiving the signals containing the reception environment information (n, SNR(n), σ), the feedback information extracting unit 23 extracts and transfers the reception environment information to the user allocation unit 24.

The user allocation unit 24, upon thus receiving the reception environment information (n, SNR(n), a) on each of the mobile terminals, estimates, based on the reception environment information, the SNR of the subcarrier block about each mobile terminal. A SNR($SN_{est}$(k)), excluding the maximum SNR, with respect to the subcarrier block k is estimated as by the following (formula 3).

[Mathematical Expression 3]

$$SNR_{est}(k) = SNR(n) - \text{table}(\sigma|k-n|)$$ (Formula 3)

where table (x) may take a value acquired from, e.g., a table stored previously in the memory etc. In this case, the table may also store each attenuation of the SNR in a relation between the delay dispersion σ and proximity (k−n) in terms of the frequency band between the subcarrier block n having the maximum SNR and the target subcarrier block.

Further, an available scheme is not to use the table but to previously define the attenuation from the maximum SNR by use of a function etc representing a parabola as by table(x) =$ax^2$. The information used for calculating the attenuation stored beforehand in the form of the table or previously defined as the function, may also be set adjustable from the outside corresponding to the installation environment of the transmitting device, the propagation environment of the radio waves and so on.

Then, the user allocation unit 24 executes the user allocation process pertaining to each mobile terminal in a way that retains the estimated information. The subsequent user allocation process is the same as in the embodiment.

Operation/Effect in Second Modified Example

In the base station device (transmitting device) and the mobile terminal (receiving device) according to a second modified example, the base station device is notified of the delay dispersion information σ in addition to the maximum SNR and the subcarrier block number (n).

In the base station device, when receiving the reception environment information from each of the plural mobile terminals serving as the communication partner devices, the SNR of each subcarrier block in the mobile terminal is estimated based on the reception environment information. In the second modified example, the estimation of this SNR involves estimating the SNR about the subcarrier block with no notification of the real-valued SNR in the relation between the maximum SNR and the delay dispersion σ.

Then, when the SNRs of the respective subcarrier blocks about the mobile terminals are individually estimated, the signals, which should be transmitted to the mobile terminals having the high SNRs with respect to the individual subcarrier blocks in the transmission signals, are preferentially allocated based on these estimated SNRs.

Thus, the scheme in the embodiment is that the reception environment information of which each mobile terminal notifies contains the delay dispersion information in addition to the information on the maximum SNR.

With this scheme, according to the second modified example, the base station device can be notified of the SNR in the periphery of the subcarrier block having the maximum SNR with the small information quantity (three items of information), and therefore the adaptive frequency allocation based on the precise reception environment information can be realized while restraining the information quantity on the feedback link.

Third Modified Example

In the reception environment information generation method and the user allocation process according to the embodiment discussed above, the mobile terminal notifies of the information on the subcarrier blocks having the SNRs of which the difference from the maximum SNR is equal to or smaller than the threshold value by employing this predetermined threshold value (XdB), however, the mobile terminal may also notify the base station device of the maximum SNR, the subcarrier block number (n) and, in addition, a relative value to the maximum SNR in the SNRs related to the subcarrier blocks peripheral to the subcarrier block number (n). The reception environment information generation process of the mobile terminal and the user allocation process of the base station device in a third modified example will hereinafter be described. For others, the mobile terminal and the base station device shall have the same functional configurations as those in the embodiment discussed above.

<Reception Environment Information Generation Process>

Figure 9:
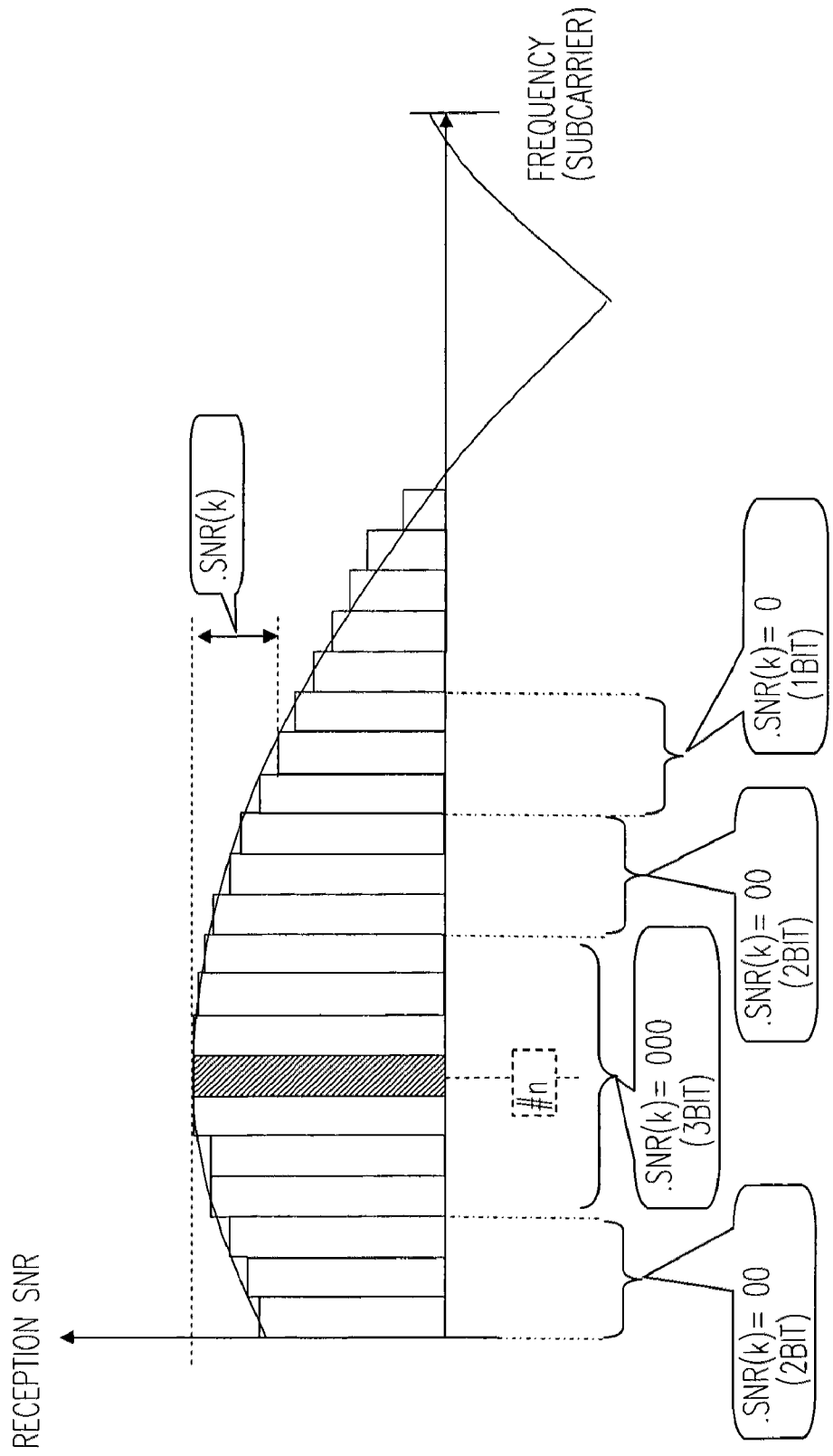
FIG. 9 is a diagram showing the concept of frequency selective fading and the concept of how reception environment information is generated in a third modified example.
Figure 10:
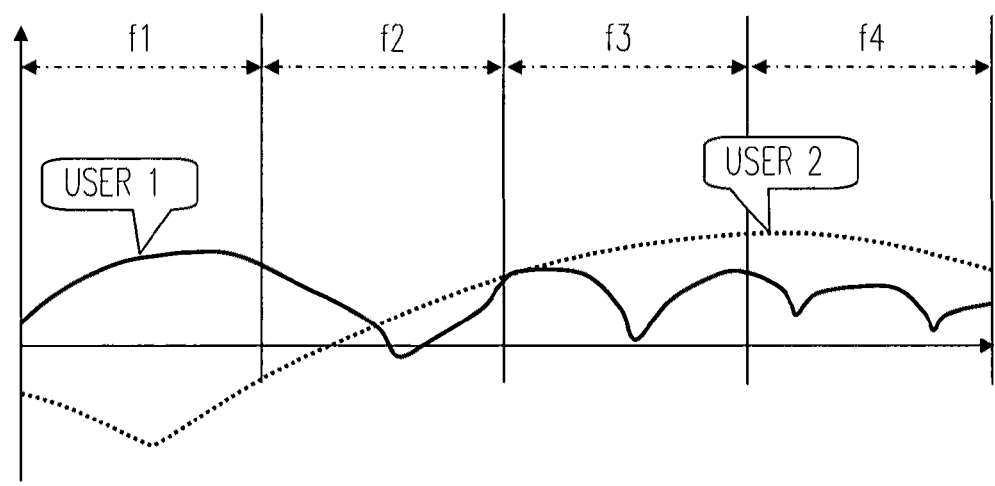
FIG. 10 is a diagram showing an example of the frequency selective fading.
Figure 11:
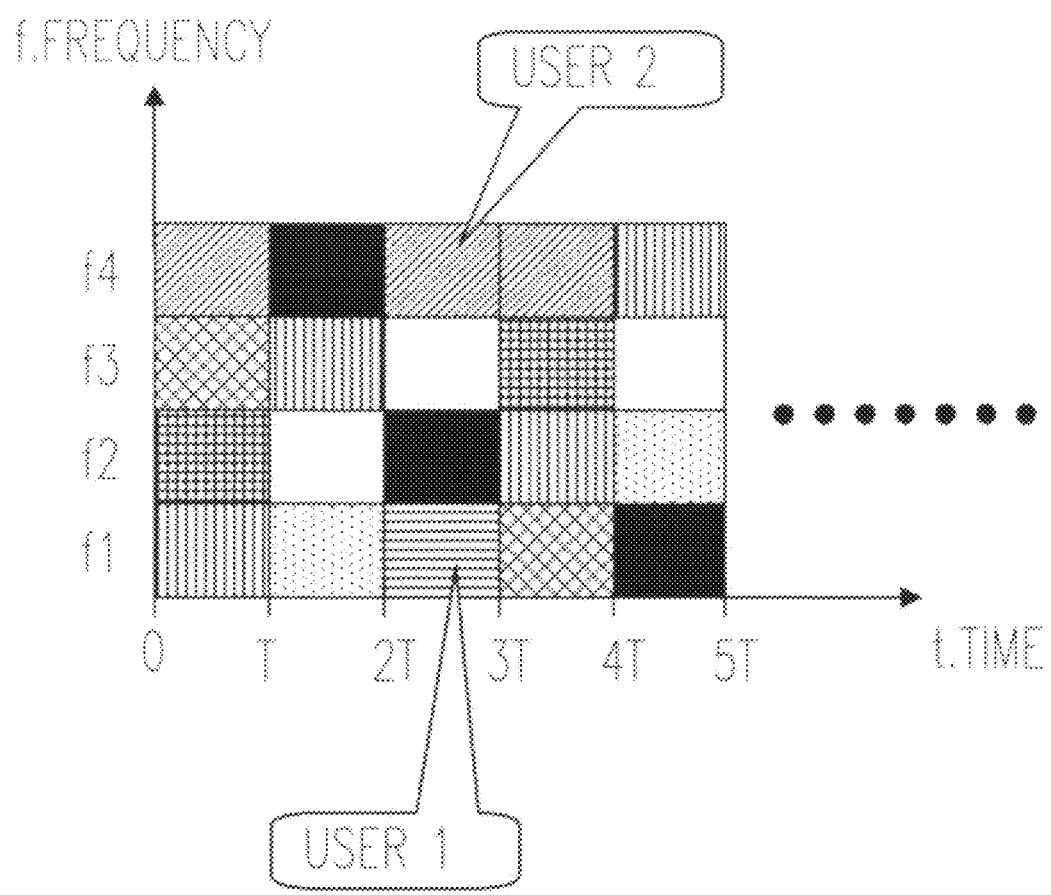
FIG. 11 is a diagram showing an example of frequency scheduling.
Figure 12:
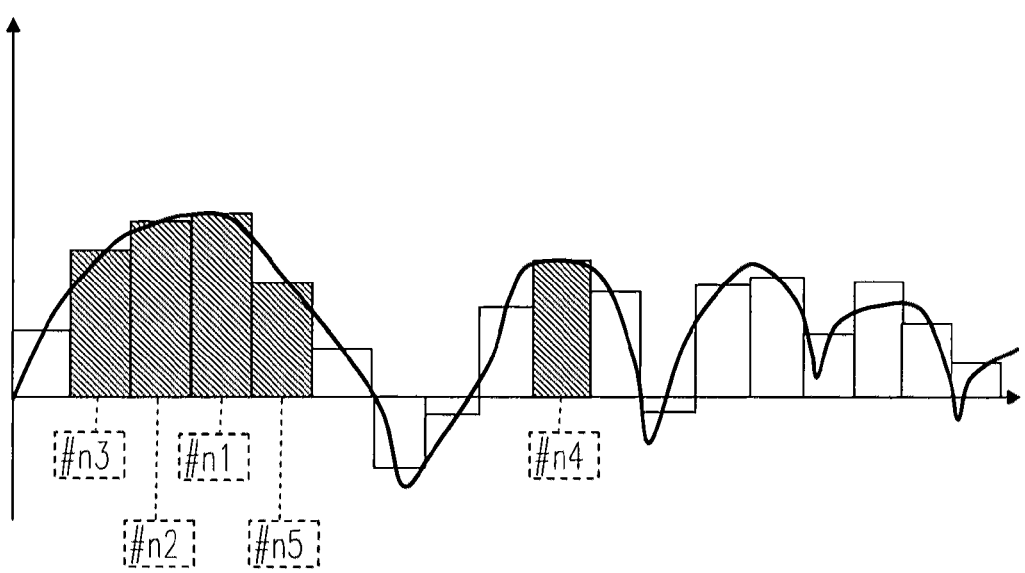
FIG. 12 is a diagram showing a concept of how the feedback information is generated by the conventional art.

The reception environment information generation process in the mobile terminal will hereinafter be described with reference to FIG. 9. FIG. 9 is a diagram showing a concept of the frequency selective fading and a concept of how the reception environment information is generated in the third modified example.

The mobile terminal receives the multicarrier signals affected by the frequency selective fading as illustrated in FIG. 9. The SNR estimation unit 47 of the mobile terminal, when receiving the signal stream corresponding to the respective subcarriers with respect to the signals affected by the frequency selective fading, estimates the average SNR (which will hereinafter be simply referred to as the SNR) of the subcarrier block. In FIG. 9, each squared bar line (quadrangle) represents the subcarrier block.

To start with, the feedback information generation unit 53 detects the subcarrier block number (subcarrier block #n in FIG. 9) having the maximum SNR from within the SNRs related to the individual subcarrier blocks.

Next, the feedback information generation unit 53 calculates difference information of the SNR from the maximum SNR with respect to the subcarrier blocks having the peripheral frequency bands in which the subcarrier block having the maximum SNR is centered. The difference information of the SNR of each subcarrier block can be expressed such as ΔSNR(k)=SNR(n)−SNR(k), where ΔSNR(k) designates the SNR difference information about the subcarrier block k with respect to the subcarrier block n having the maximum SNR.

The feedback information generation unit 53 sets the thus-calculated SNR difference information related to each subcarrier block to a predetermined bit count. The bit structure representing this SNR difference information may use a fixed bit structure determined beforehand in the system. FIG. 9 illustrates an example of being configured so that the bit count used for showing the SNR difference information decreases at every distance covering a predetermined range (corresponding to a predetermined number of subcarrier blocks) from the subcarrier block having the maximum SNR.

In this case, the SNR of the subcarrier block n having the maximum SNR is expressed by 8 bits, and, a bit structure of the SNR difference information is that the subcarrier blocks in a range of the three subcarrier blocks from the subcarrier block n are expressed by 3 bits, and the bit count decreases by 1 bit for every three subcarrier blocks. This relation can be expressed by use of the subcarrier block k as follows.

When $0 < |k.n| \leq 3$,  (1)

$\Delta SNR(k)$ = [000]: 0 dB or larger but less than 1 dB
       = [001]: 1 dB or larger but less than 2 dB
       ...
       = [111]: 7 dB or larger When $3 < |k.n| \leq 6$,  (2)

$\Delta SNR(k)$ = [00]: 0 dB or larger but less than 2 dB
       = [01]: 2 dB or larger but less than 4 dB
       = [10]: 4 dB or larger but less than 6 dB
       = [11]: 6 dB or larger When $6 < |k.n| \leq 9$,  (3)

$\Delta SNR(k)$ = [0]: 0 dB or larger but less than 4 dB
       = [1]: 4 dB or larger (4) When $9<|k.n|$, none of the reception environment information is generated.

<User Allocation Process>

In the base station device, when receiving the signals containing the reception environment information (the SNR difference information ΔSNR(k) between the respective subcarrier blocks of n, SNR(n), |k.n|≦9), the feedback information extracting unit 23 extracts and transfers the reception environment information to the user allocation unit 24.

The user allocation unit 24, upon receiving the reception environment information on each mobile terminal, estimates, based on this reception environment information, each of the subcarrier blocks in the interval of |k.n|≦9 regarding to each mobile terminal. At this time, it is assumed that the user allocation unit 24 grasps the bit structure for representing the SNR difference information and estimates, based on these items of information, the SNRs of the individual subcarrier blocks. The bit structure for representing the SNR difference information may be previously stored as the fixed information in the memory etc, and the base station device and the mobile terminals may also notify each other of the bit structure as the necessity arises.

Then, the user allocation unit 24 executes the user allocation process pertaining to each mobile terminal in a way that retains the estimated information. The subsequent user allocation process is the same as in the embodiment.

Operation/Effect in Third Modified Example

In the base station device (transmitting device) and the mobile terminal (receiving device) according to a third modified example, the base station device is notified of the difference information from the maximum SNR of the SNRs related to the subcarrier blocks having the frequency bands peripheral to the subcarrier block number (n) in addition to the maximum SNR and the subcarrier block number (n) thereof.

Further, the reception environment information is generated in a state where the difference information from the maximum SNR is expressed based on the predetermined bit structure. A scheme in the third modified example is that the bit count to be used decreases at every distance of a predetermined subcarrier block range from the subcarrier block n having the maximum SNR In the base station device, when receiving the reception environment information from each of the plural mobile terminals serving as the communication partner devices, the SNR of each subcarrier block in the mobile terminal is estimated based on the reception environment information. The estimation of the SNR can be realized on the assumption that the base station device recognizes the bit structure in which the plurality of mobile terminals sets the SNR difference information.

Then, when the SNR of each subcarrier block about the mobile terminal is estimated respectively, the signals, which should be transmitted to the mobile terminals having the high SNRs with respect to the subcarrier blocks in the transmission signals, are preferentially allocated based on those estimated SNRs.

Thus, according to the embodiment, the difference information of which each mobile terminal notifies is generated in a way that rounds, with the predetermined bit count, the SNR difference information from the maximum SNR with respect to the subcarrier blocks peripheral to the subcarrier block n having the maximum SNR in addition to the information on the maximum SNR.

This is, in the same way as in the embodiment, the scheme utilizing the tendency that the width of one subcarrier block becomes relatively smaller than what is affected by the frequency selective fading with the result that a change in the SNR of each subcarrier block gets gentle.

Owing to this scheme, according to the third modified example, the base station device can be notified of the SNRs of the subcarrier blocks peripheral to the subcarrier block having the maximum SNR with the small information quantity, and it is therefore possible to realize the adaptive frequency allocation based on the precise reception environment information while restraining the data size on the feedback link.

What is claimed is:

1. A receiving device comprising:
   a receiving unit to receive multicarrier signals in which a plurality of subcarriers are divided into a plurality of subcarrier blocks each containing at least one subcarrier, and in which signals to be transmitted to receiving devices are allocated on a subcarrier block basis;

an estimating unit to estimate, for each of the plurality of subcarrier blocks, quality values indicative of reception states of the signals allocated to the plurality of subcarrier blocks; and a notifying unit to notify a transmitting device of information indicative of a high-quality subcarrier block having a high quality value in the quality values, a quality value of the high-quality subcarrier block, and a continuous interval of the subcarrier blocks having the quality values of which a difference from the quality value of the high-quality subcarrier block falls within a predetermined difference.

2. The receiving device according to claim 1, wherein the notifying unit notifies of, as the continuous interval of the subcarrier blocks having the quality values of which the difference from the quality value of the high-quality subcarrier block falls within the predetermined difference, information indicative of the subcarrier block having a minimum frequency band and information indicative of the subcarrier block having a maximum frequency band in the subcarrier blocks falling within the continuous interval.

3. The receiving device according to claim 2, wherein the notifying unit also notifies of, together with the information indicative of the subcarrier block having the minimum frequency band and the information indicative of the subcarrier block having the maximum frequency band, a quality value of the subcarrier block having the minimum frequency band and a quality value of the subcarrier block having the maximum frequency band.

4. The receiving device according to claim 1, wherein the transmitting device notifies of the predetermined difference.

5. The receiving device according to claim 1, further comprising a dispersion estimating unit to estimate a delay dispersion of the received multicarrier signals, wherein the notifying unit notifies the transmitting device of the delay dispersion estimated by the dispersion estimating unit in place of the continuous interval of the subcarrier blocks.

6. The receiving device according to claim 1, wherein the notifying unit further includes a generating unit to generate difference information in which a difference between the quality value of the high-quality subcarrier block and the quality value of each of the plurality of subcarrier blocks is expressed by amount of information that becomes smaller with respect to the subcarrier block having the frequency band existing farther from the frequency band of the high-quality subcarrier block, and notifies the transmitting device of the difference information in place of the continuous interval of the subcarrier blocks.

* * * * *